US008498900B1

(12) United States Patent
Spirin et al.

(10) Patent No.: US 8,498,900 B1
(45) Date of Patent: Jul. 30, 2013

(54) BAR OR RESTAURANT CHECK-IN AND PAYMENT SYSTEMS AND METHODS OF THEIR OPERATION

(75) Inventors: Gennady Spirin, New York, NY (US); Jeffrey McGregor, New York, NY (US)

(73) Assignee: Dash Software, LLC, New York, NY (US)

( * ) Notice: Subject to any disclaimer, the term of this patent is extended or adjusted under 35 U.S.C. 154(b) by 0 days.

(21) Appl. No.: 13/534,310

(22) Filed: Jun. 27, 2012

Related U.S. Application Data

(60) Provisional application No. 61/511,171, filed on Jul. 25, 2011.

(51) Int. Cl.
*G06Q 30/00* (2012.01)
*G06Q 50/00* (2012.01)
*G07B 17/00* (2006.01)
*G07F 19/00* (2006.01)
*G08B 5/36* (2006.01)

(52) U.S. Cl.
USPC ............................. 705/15; 705/30; 340/286.09

(58) Field of Classification Search
USPC ........................................................... 705/15
See application file for complete search history.

(56) References Cited

U.S. PATENT DOCUMENTS

| | | | |
|---|---|---|---|
| 5,235,509 A * | 8/1993 | Mueller et al. ................... | 705/15 |
| 7,336,973 B2 | 2/2008 | Goldthwaite et al. | |
| 7,584,886 B2 | 9/2009 | Labaton | |
| 7,774,231 B2 | 8/2010 | Pond et al. | |
| 7,784,684 B2 | 8/2010 | Labrou et al. | |
| 7,945,477 B2 * | 5/2011 | Werbitt ........................... | 705/15 |
| 2002/0026364 A1 * | 2/2002 | Mayer et al. ..................... | 705/15 |
| 2003/0014330 A1 * | 1/2003 | Showghi et al. ................ | 705/26 |
| 2003/0046166 A1 * | 3/2003 | Liebman ......................... | 705/15 |
| 2004/0143503 A1 * | 7/2004 | Suthar ............................. | 705/15 |
| 2004/0158494 A1 * | 8/2004 | Suthar ............................. | 705/15 |
| 2005/0043996 A1 * | 2/2005 | Silver .............................. | 705/15 |
| 2007/0233615 A1 * | 10/2007 | Tumminaro ..................... | 705/75 |
| 2007/0244811 A1 | 10/2007 | Tumminaro | |
| 2008/0046366 A1 | 2/2008 | Bemmel et al. | |
| 2008/0147514 A1 | 6/2008 | Shuster et al. | |
| 2009/0037286 A1 * | 2/2009 | Foster ............................. | 705/21 |
| 2009/0307140 A1 | 12/2009 | Mardikar | |
| 2009/0327130 A1 | 12/2009 | Labaton | |
| 2010/0030578 A1 * | 2/2010 | Siddique et al. .................. | 705/3 |
| 2011/0313871 A1 * | 12/2011 | Greenwood ..................... | 705/16 |

* cited by examiner

*Primary Examiner* — Ig T An
(74) *Attorney, Agent, or Firm* — Eric L. Sophir; Dentons US LLP

(57) ABSTRACT

A method for allowing a customer to view and at least partially pay a bill incurred in a bar or a restaurant operating a POS system tracking the bill. The customer operates a mobile computing device running a mobile app communicating with the POS system. The bar or the restaurant has staff. The method includes receiving, via the POS system, check-in data in response to checking-in via the app and payment account data as a security in response to authorizing access to the payment account data via the app. The method includes receiving, via the staff, an order from the customer and associating, via the staff, the order with the payment account data in the POS system. The method includes displaying the bill in real-time via the app. The bill includes the order. The method includes receiving at least partial payment in response to such authorizing via the app.

14 Claims, 7 Drawing Sheets

BAR OR RESTAURANT CHECK-IN AND PAYMENT SYSTEMS AND METHODS OF THEIR OPERATION

CROSS-REFERENCE TO RELATED APPLICATIONS

This application claims priority to U.S. Provisional Application Ser. No. 61/511,171, filed on Jul. 25, 2011, which is herein incorporated by reference in its entirety.

TECHNICAL FIELD

Generally, the present disclosure relates to a restaurant or a bar check-in and payment system. More particularly, the present disclosure relates to a technology for viewing a bill and conducting a corresponding payment transaction in a restaurant or a bar using a mobile computing device.

BACKGROUND

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

Many business establishments, such as bars or restaurants, serve food and drinks to customers for consumption on the premises in exchange for money. When a customer visits one of these establishments, the customer generally sits down at an empty table, while waiting for a waiter to arrive and take the customer's order. Typically, after the waiter arrives and takes the customer's order, the waiter enters the order into a point-of-sale (POS) system so that the order can be timely prepared and tracked for payment. When the order is ready, the waiter brings the order to the customer. At some point, the waiter, either upon the customer's request or through the establishment's serving procedure, brings a bill for the order to the customer. If the bill is correct, then the customer pays by handing cash, a check, a prepaid card or a credit card to the waiter. Subsequently, the waiter takes the proffered form of payment and manually pays the bill via the POS system. If the bill is incorrect, then the waiter uses the POS to correct the bill and provide the bill, as corrected, to the customer for payment.

One drawback of the above is that prior to the bringing of the order, short of asking the waiter or viewing the POS system, the customer is unable to verify that the order, as placed by the customer, was correctly entered into the POS system. If the waiter is serving many patrons or tables simultaneously, then this can be particularly frustrating to the customer. Incorrect orders, especially if reoccurring, are inefficient for the establishment's operation, reduce the establishment's profitability if detected after the order has been prepared, harm the establishment's reputation and can be grounds for the waiter's termination.

Another drawback of the above is that the manual payment of the bill is relatively slow and prone to errors and fraud. If the waiter is serving many patrons or tables simultaneously, then this can be particularly frustrating to the customer. Quick bill payment improves the establishment's operation as more customers can be served, while increasing time for attending to new customers, who often wait for service or open tables. Similarly, billing errors and fraud are inefficient for the establishment's operation, harm the establishment's reputation, reduce the establishment's profitability and can expose the establishment to lawsuits.

Yet another drawback of the above is that the customer is unable to easily pay a portion of the bill in sequential portions. Since some establishments, like bars, have running tabs, especially for groups of customers, when the customer periodically pays the bills in sequential portions, these establishments reduce the occurrence of unpaid large bills, while increasing their profitability. Similarly, the customer's ability to pay in sequential portions allows the customer to budget accordingly and prevent many payment-related mishaps.

Still another drawback of the above is that the customer is unable to accurately determine, in real-time, the total amount of charges incurred by the customer at any given moment. Knowledge of one's bill, in real-time, enables the customer to budget accordingly, prevent many payment-related mishaps and perceive the establishment in better light. Likewise, the establishment's reputation is enhanced and business operation improved when its employees are able to accurately determine, in real-time, the total amount of charges incurred by any of its customers at any given moment.

Yet still another drawback of the above is that during the manual payment of the bill, the waiter is often unable to perform other tasks, such as taking a new order from a new customer or bringing the order to another customer. Efficiency of waiter operations is important to the operation of the establishment as the establishment's profitability and reputation are improved when the waiters are constantly serving the customers and the customers feel cared for.

Any of the above or permutations thereof are made more complex if the bill is long or complicated or when a group of customers dine together and each member of the group desires to pays separately. As a result, there is room for error. Cumulatively, such occurrences can ruin the establishment's reputation and reduce visits from other customers. This is becoming especially common when the customers post comments on their experience in the establishment on popular social networking sites or review sites.

Accordingly, there is a need to address at least one of the above.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment of the present disclosure is to provide a technology for allowing a customer to view and pay at least a portion of a bill incurred in a bar or a restaurant.

An example embodiment of the present disclosure is a method for allowing a customer to view and at least partially pay a bill incurred in a bar or a restaurant. The customer operates a mobile computing device running a mobile app. The bar or the restaurant operates a POS system tracking the bill. The bar or the restaurant has staff. The app communicates with the POS system. The method includes receiving, via the POS system, check-in data in response to checking-in via the app and payment account data as a security in response to authorizing access to the payment account data via the app. The method also includes receiving, via the staff, an order from the customer and associating, via the staff, the order with the payment account data in the POS system. The method further includes displaying the bill in real-time via the app. The bill includes the order. The method additionally includes receiving at least partial payment in response to authorizing the at least partial payment via the app.

Another example embodiment of the present disclosure is a method for allowing a customer to view and at least partially pay a bill incurred in a bar or a restaurant. The customer operates a mobile computing device running a mobile app. The bar or the restaurant operates a POS system tracking the bill. The bar or the restaurant has staff. The app communicates with the POS system. The method includes receiving, via the POS system, check-in data and payment account data submitted via the app and an order from the customer taken by the staff. The check-in data indicates the customer as being physically present in proximity to the POS system. The payment account data serves as a security. The method also includes associating, in the POS system, by the staff, the order with the payment account data. The method further includes sending, from the POS system, display data to the app for displaying the bill via the app in real-time. The bill includes the order. The method additionally includes at least partially charging, via the POS system, the security for the bill in response to at least partial charge authorization via the app.

The present disclosure may be embodied in the form illustrated in the accompanying drawings. Attention is called to the fact, however, that the drawings are illustrative. Variations are contemplated as being part of the disclosure, limited only by the scope of the claims. The above and other features, aspects and advantages of the present disclosure will become better understood to one skilled in the art with reference to the following drawings, detailed description and appended claims.

BRIEF DESCRIPTION OF THE DRAWINGS

The accompanying drawings, which are incorporated into and form a part of the specification, illustrate example embodiments of the present disclosure. Together with the detailed description, the drawings serve to explain the principles of the present disclosure. The drawings are only for the purpose of illustrating example embodiments of the present disclosure and are not to be construed as necessarily limiting the disclosure. Like numbers can refer to like elements throughout. The above and other aspects, advantages and features of the present disclosure will become better understood to one skilled in the art with regard to the following description, appended claims and accompanying drawings where:

DETAILED DESCRIPTION OF THE PREFERRED EMBODIMENTS

Figure 1:
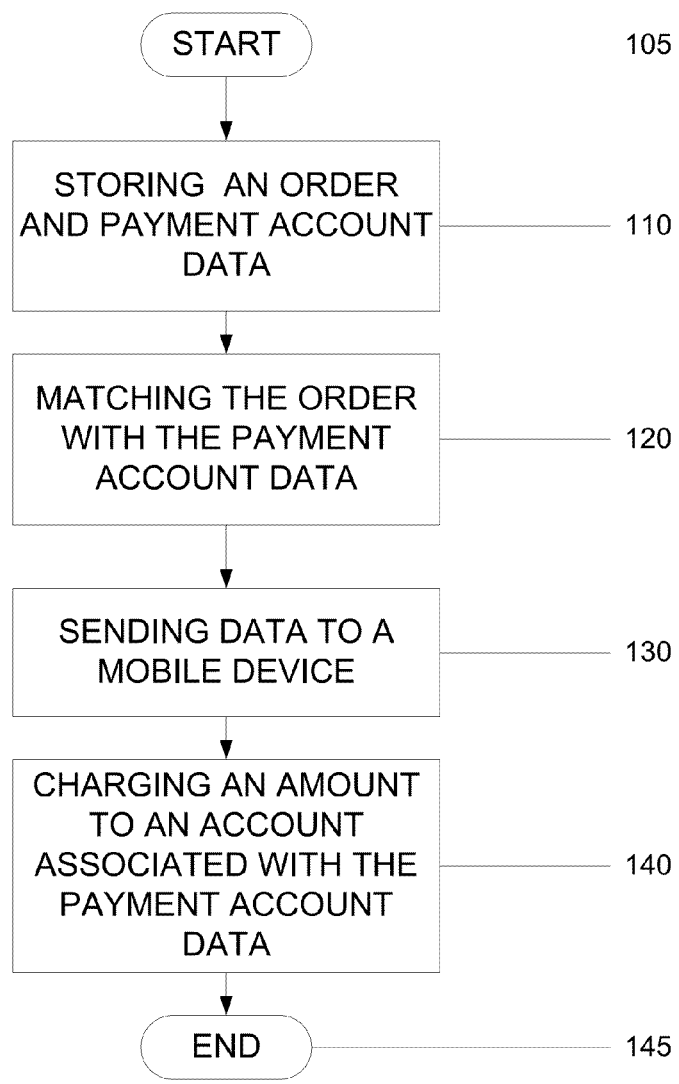
FIG. 1 is a flowchart of an example embodiment of a process performed by a POS for allowing a user of a mobile device to view, share and pay a bill in a restaurant or a bar in real-time via the mobile device according to the present disclosure.

The present disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Any verbs as disclosed herein can imply direct or indirect action or inaction. For example, when an element is referred to as being "on," "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. It will be further understood that the terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Hereinafter, the present disclosure will be described in detail with reference to the accompanying drawings.

An example embodiment of the present disclosure is a system that allows a smartphone to interface with a POS system at a bar or restaurant in order to allow a patron to view and pay their bill using an application on the smartphone. To accomplish this, the smartphone has an application that stores credit card information for the user. The application is capable of communicating with the POS system that the restaurant uses to take orders and keep track of tabs/bills. The system generally operates by the smartphone allowing the user to check in at the restaurant so that "Joe Smith" will show up on the POS system as a patron. The credit card info stored in the smartphone application is transferred to the POS system as "security"—just as one might hand their credit card over at a bar to start a tab. When restaurant staff takes the order from the patron, the patron would identify himself as "Joe Smith", and the restaurant would place the order, and put it on Joe Smith's account. As Joe Smith's order is entered in the POS system, it will be updated in the smartphone app, so that Joe Smith can view his bill. Some of the above steps are repeated, where orders are placed, and the tab is updated. At any point, Joe Smith can pay his bill, or a portion of his bill using the smartphone application. Other users that have the application can split the tab with Joe Smith, or could pay their portion in cash as normal. Once the bill is paid, Joe Smith can close the account at the restaurant, to prevent unauthorized ordering on his account.

An example embodiment of the present disclosure is a method for allowing a customer to view and at least partially pay a bill incurred in a bar or a restaurant. The customer operating a mobile computing device running a mobile app. The bar or the restaurant operating a POS system tracking the bill. The bar or the restaurant having staff. The app communicating with the POS system. The method includes receiving, via the POS system, check-in data in response to checking-in via the app and payment account data as a security in response to authorizing access to the payment account data via the app. The method includes receiving, via the staff, an order from the customer. The method includes associating, via the staff, the order with the payment account data in the POS system. The method includes displaying the bill in real-time via the app. The bill including the order. The method includes receiving at least partial payment in response to authorizing the at least partial payment via the app. The method can include modifying, via the staff, the order in the POS system. The method can include updating the bill via the POS system. The updating corresponding to the modifying, wherein the displaying and the receiving reflecting the updating. The method can include splitting the bill between the customer and another customer in response to bill split authorization via the app. The another customer operating another mobile computing device running another mobile app in communication with the POS system. The split reflecting in the another app. The method can include halting access to the payment account data in the POS system after the receiving in response to authorizing the halting via the app. The method can include deleting the payment account data in the POS system after the receiving in response to authorizing the deleting via the app. The method can include displaying, via the POS, the customer as being physically present in proximity of the POS system in response to the checking-in, wherein the authorizing the at least partial payment via the app including authorizing charging the security.

An example embodiment of the present disclosure is a method for allowing a customer to view and at least partially pay a bill incurred in a bar or a restaurant. The customer operating a mobile computing device running a mobile app. The bar or the restaurant operating a POS system tracking the bill. The bar or the restaurant having staff. The app communicating with the POS system. The method includes receiving, via the POS system, check-in data and payment account data submitted via the app and an order from the customer taken by the staff. The check-in data indicating the customer as being physically present in proximity to the POS system. The payment account data serving as a security. The method includes associating, in the POS system, by the staff, the order with the payment account data. The method includes sending, from the POS system, display data to the app for displaying the bill via the app in real-time, the bill including the order. The method includes at least partially charging, via the POS system, the security for the bill in response to at least partial charge authorization via the app. The method can include modifying, via the staff, the order in the POS system. The method can include updating the bill via the POS system. The updating corresponding to the modifying, wherein the sending and the charging reflecting the updating. The method can include splitting the bill between the customer and another customer in response to bill split authorization via the app. The another customer operating another mobile computing device running another mobile app in communication with the POS system. The split reflecting in the another app. The method can include halting access to the payment account data in the POS system after the charging in response to authorizing the halting via the app. The method can include deleting the payment account data in the POS system after the charging in response to authorizing the deleting via the app.

FIG. 1 is a flowchart of an example embodiment of a process performed by a POS for allowing a user of a mobile computing device to view, share and pay a bill in a restaurant or a bar in real-time via the mobile device according to the present disclosure. Process 100 includes steps 105-145.

Process 100 starts in block 105. Any portions of process 100 can be performed on a system comprising a computer processor and on an application configured to execute on the computer processor. Computer instructions for executing process 100 can be stored on a computer program product comprising a tangible storage medium readable by a processing circuit and storing instructions for execution by the processing circuit for performing the method of process 100.

Block 110 is storing, in a POS system, an order and payment account data. The user or a party associated with the user places the order to the waiter. Alternatively, other staff, such as a cashier, a cook, a janitor, a manager or a headwaiter, can take the order. The payment account data is received from the mobile device.

The POS system includes a processor in communication with a memory storing data, which includes the order and the payment account data. The POS system can be an electronic cash register machine, which includes a credit card processing unit and cash storage. The POS system can include a means for wired or wireless communication over a network. The means are in communication with the processor. For example, such means can be a dock, a port or an antenna. The POS system can be linked to a website capable of receiving orders or processing payment. The POS system can include a sensor for remote detection of the mobile device. The processor can be a single core, dual core, a multi-core or a system-on-chip. The memory can be random-access memory (RAM), virtual storage, real storage, cloud storage, flash memory or physical disk storage, such as an internal or external hard drive. The data stored in the memory can be encrypted and stored in the memory in an encrypted state. The data can be received in an encrypted state and then be decrypted, either on-the-fly or on-demand, and stored in a decrypted state in the memory.

The mobile device includes a processor in communication with a memory, an input means, such as a keyboard, a touchscreen or a microphone, and an output means, such as a display or a speaker. The mobile device can be a smartphone or a tablet computer.

The order is placed for a food item, such as bread, steak or chips, or a liquid item, such as water, soda, juice, spirits or beer. The order is placed by the user of the mobile device or a party, such as a friend, a child or a spouse, associated with the user of the device. For example, if a parent and a child visit a restaurant and the parent controls the mobile device, then either the parent or the child can place the order on behalf of the child and the parent. The order can be placed via an oral communication to a waiter, who enters the order into the POS system. The order can also be placed by orally speaking into a microphone, such as at a drive-in at a restaurant, and the waiter manually entering the order into the POS system. The order can be placed into a voice recognition system where the order is automatically entered into the POS system.

The payment account data is data that allows a vendor, such the restaurant or the bar, to place a charge onto an account associated with a domestic or a foreign financial institution. Although typically, the account will be the account of the user of the mobile device, other accounts can be used as well. For example, a user of the mobile device may provide information of the account associated with the user's parent, a spouse, a child or a friend. The payment account data can be credit card information, such as a credit card account number, a name associated with the credit card account, an expiration data and a security code. The payment account data can be debit card information, such as a debit card account number, a name associated with the debit card account and a personal identification number (PIN). The payment account data can be a gift card account data, such as a gift card number and a PIN. The payment data can be real or virtual currency or rewards points. The payment account data can be financial institution website login data or data stored on a website, such as a payment account data aggregator. For example, the user logs onto such website and manually inputs or imports the payment account data from the website into the software application. Alternatively, the software application is programmed to automatically login into the website, access the payment account data and either communicate the payment account data to the POS system without permanently locally storing the payment account data or import the payment account data information into the software application and then transmit the payment account data to the POS system.

The payment account data can be stored in or accessible via the memory of the mobile device. For example, the user manually inputs the payment account data into a software application running on the mobile device. The user can manually input the data before or after entry into the restaurant or the bar. Alternatively, the payment account data is stored in a Near Field Communication (NFC) chip in communication with the mobile device, which includes the NFC chip. For example, a software application running on the mobile device accesses the payment account data stored on the NFC chip. Alternatively, the software application accesses the payment account data from a payment account data aggregator. The payment account data can be stored in another mobile device and the mobile device accesses the another mobile device to retrieve/import the payment account data onto the mobile device. Alternatively, the payment account data can be stored remotely for remote access, such as via a website or web accessible service.

Upon access of the payment account data, the software application, directly or indirectly, communicates with the POS system via the wireless or the wired means. If the software application is capable of directly communicating with the POS system, then if the mobile device is present within a detection range of the POS system, then the mobile device or the POS system, either manually or automatically, detects the location/presence of the POS system or the mobile device, respectively. If the software application is capable of indirect communication with the POS system, such as over the Internet or cellular networks, then, upon the user's action, such as logging into a website or a service associated with the POS system, the POS system detects the presence of the mobile device. As a result, the mobile device appears local or as within the detection range on a display of the POS system and the waiter can take the order from the user.

The software application can be generic or specific to the restaurant or the bar. The software application can be a mobile app. For example, the bar has a software application specific to its POS system. Thus, the user downloads and installs a specific software application for that POS system. In order to properly operate, the specific software application requires a creation of an account, which requires entry of the payment account data. The payment account data can be manually entered, imported from an NFC chip or the memory or accessed via the Internet. Upon creation of the account and visiting of the bar, irrespective of the placement of the order, the user runs the specific software application, which communicates with the POS and allows for display of information indicating the presence of the user.

The payment account data is transmitted from the mobile device and is received at the POS system. The transmission of the payment account data can be over any wireless technology standard, such as via any type of cellular phone network or a wireless Internet network. The transmission can be performed via a website linked to the POS system. The transmission of the payment account data can be performed via a wireless personal area network (WPAN), a wireless local area network (WLAN), infrared technology, NFC technology or Bluetooth technology. The payment account data can be transmitted via a wired technology standard. For example, the payment account data can be transmitted via Ethernet docking the mobile device at a docking station stationed at an entrance of the restaurant or the bar.

The storing of the payment account data is performed for the purpose of security similarly to a bar patron who may be required to hand over his/her credit card in order to start a tab in a bar. The restaurant or the bar may ensure that the provided payment account data is valid by charging the account in advance, prior to servicing the user, for a predetermined or a customized amount. The restaurant or the bar may ensure the validity of the provided payment account data via payment verification methods, as known in the art.

Block 120 is matching, in the POS system, the order with the payment account data. For example, when the waiter receives the order from the user or the party associated with the user, the waiter enters the order into the POS system. Then, the POS system, manually via the waiter or automatically on its own, matches the credit card account information to the order or the party who made the order, such as the user of the mobile device or the party associated with the user. Alternatively, the POS system matches the order to the account associated with the stored payment account data. If the order is subsequently modified, then the order, such as a bar tab, is updated.

Block 130 is sending order data to the mobile device for display on the mobile device. The order data includes an itemized price list of the order, such as a listing of an ordered item and its price, and a total amount due of the order, such as a sum of all prices of all ordered items. The sending can be performed wired or wirelessly, as described above.

For example, as or after the waiter enters the order into the POS system, the POS system stores the order and then wirelessly sends a message, which includes the order data, to the mobile device for display on the mobile device. The sending of the message allows real-time display of the stored order on the mobile device. Alternatively, the message can be sent, once or multiple times, via a predetermined time delay or upon a request to the mobile device. If the order is subsequently modified, then the order, such as a bar tab, is updated and then a new message, which includes the updated order data, is sent to the mobile device for display on the mobile device.

Block 140 is upon receipt of a pay bill request from the mobile device, charging an amount to the account associated with the payment account data. The amount is equal to or less than the total amount due of the order.

The pay bill request is a message/signal received from the mobile device. This message/signal indicates the user's desire to pay the bill for the order that was previously sent for display on the user's mobile device. The pay bill request can be received via the wired or the wireless means, as described above. The user can send a pay bill request expressing a desire to pay the entire bill (equal to the total amount due of the order) or a part of the bill (less than the total amount due of the order). If the user pays part of the bill, then another user, can send his/hers payment account data to the POS system and pay the difference of the bill. The difference can be the entire difference, which totally extinguishes liability of the bill, or a partial difference, which partially extinguishes the liability of the bill. Another user can thus continue the process and pay the remainder of the bill. Thus, the payment of the bill can be relatively quickly split among any amount of users and the same tab can be continuously running.

Multiple users with multiple identical, similar or distinct mobile devices may order multiple items, which may be stored as one order. Upon storage of the order and the payment account data from multiple users, the POS system sends the bill to the mobile devices and the multiple users can submit multiple distinct pay bill requests, in any sequence, to pay their share or any amount of the bill.

Process 100 can include storing check-in data in the POS system prior to the matching. The check-in data is received from the mobile device and the payment account data includes credit card, gift card or debit card account information. The check-in data allows the user to use an electronic communication standard, such as text messaging, cellular network, Wi-Fi or global position system (GPS), on the mobile device to let the bar or the restaurant know location of exactly where the user is. For example, the user who wishes to announce his/her location to the bar or the restaurant would tap a "check-in" touchscreen icon on displayed on a touchscreen of the mobile device in order to see a list of places nearby and then choose the restaurant or the bar that matches where he/she is.

Figure 2:
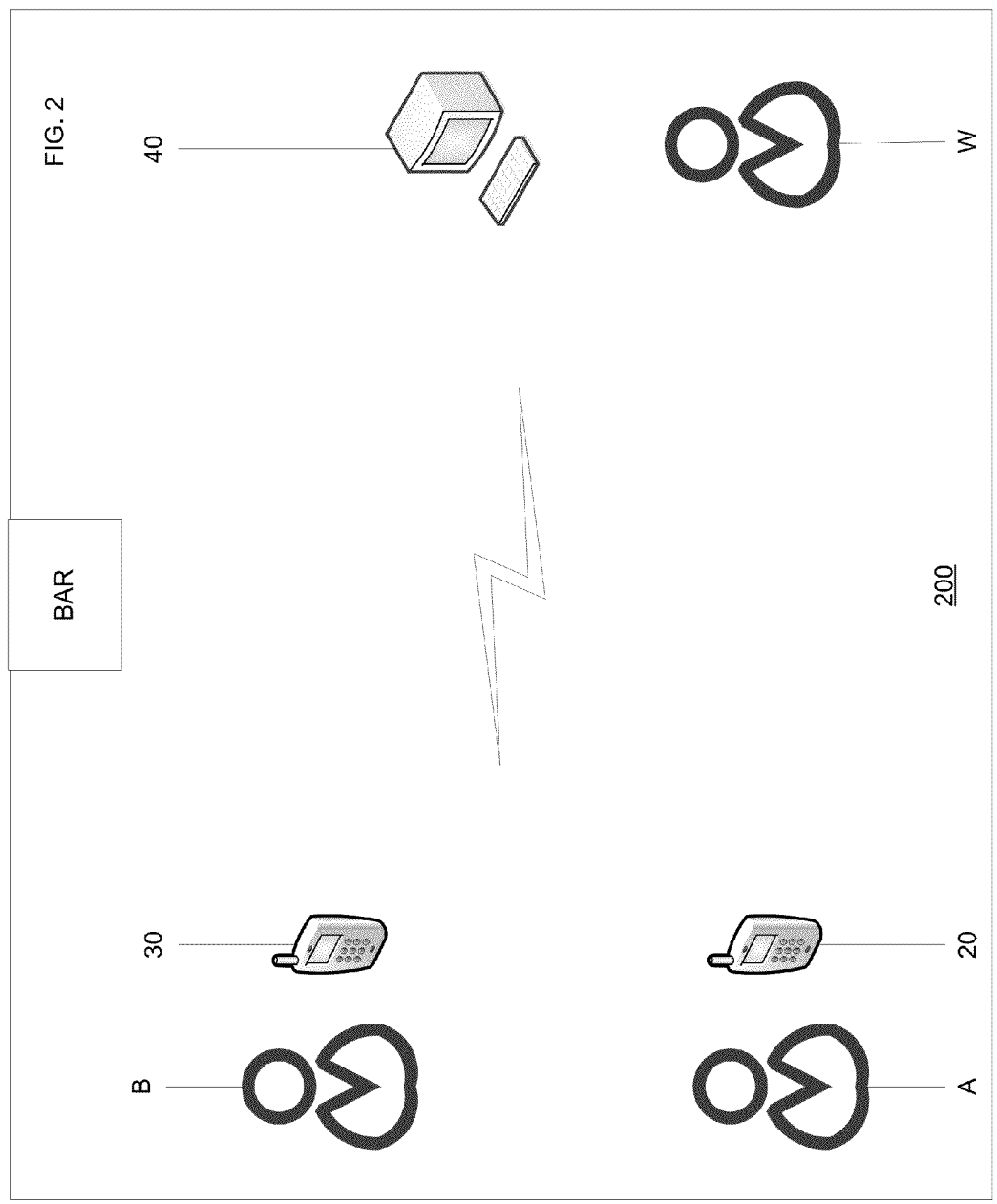
FIG. 2 is a diagram of an example embodiment of a network environment for allowing a user of a mobile device to view, share and pay a bill in a restaurant or a bar in real-time via the mobile device according to the present disclosure.

As shown in FIG. 2, user A can share a bill with user B. When the user checks into the bar or the restaurant, the user also can "tag" any friends who are with them and let the restaurant or the bar know that the tagged person is there, too. If the user and his/her friend decide to split the tab, then the friend only has to provide his/hers payment account information. To cut down on the potential for the user to falsely tag a friend to the restaurant, the user can tag the friend only if the friend also checks-in to the restaurant or the bar.

The check-in data and the payment account data can be the same when the receipt of the payment account data indicates the location of the user if, for example, the electronic communication between the mobile device and the POS system is performed over a short distance, such as via a local router, local cellular base, the Bluetooth or the NFC protocol.

Process 100 can include matching the check-in data with the order or the payment account data. Thus, to ensure payment to the restaurant or the bar and to reduce errors and fraud, the check-in data is matched with the payment account data and the order data to ensure that the user is actually present within the domain of the restaurant or the bar and the user actually placed the order and the user has the financial means to pay for the placed order.

Process 100 can include the receipt of the check-in data or the payment account data, via a wireless transmission protocol. This receipt can be in an encrypted state. Some examples of wireless transmission protocols are 802.11 electronic communication protocols. Some examples of encryption protocols are Pretty Good Privacy (PGP) or Wired Equivalent Privacy (WEP). The mobile device can encrypt the check-in data or the payment account data before sending to the POS system and likewise the POS system can be equipped with corresponding decryption software to decrypt the received message/signal.

Process 100 can include after the wirelessly sending, modifying the order and sending the order data to the mobile device. The order data is modified to reflect the modifying.

Process 100 can include if the amount is less than the total amount due of the order, then receiving and storing second payment account data from a second user of a second mobile device. Process 100 can further include matching, in the POS system, the order with the second payment account data, determining a difference between the total amount due and the amount and wirelessly sending the order data to the second mobile device for display on the second mobile device. The order data includes a second itemized price list of the order and the difference. The second itemized price list includes an unpaid item. Process 100 can further include upon receipt of a second pay bill request from the second mobile device, charging a second amount to a second account associated with the second payment account data. The amount is equal to the difference.

Process 100 can include halting access to the payment account data after the charging. In order to prevent unauthorized charges, the halting can include either blocking all or partial access to the payment account, while storing the payment account data in the POS system or deleting the payment account data from the POS system. The halting access can be performed upon a user request, such as an oral request or a request sent via the mobile phone.

FIG. 2 is a diagram of an example embodiment of a network environment 200 for allowing a user of a mobile device to view, share and pay a bill in a restaurant or a bar in real-time via the mobile device according to the present disclosure. Some elements of this figure are described above. Thus, same reference characters identify same or like components described above and any repetitive detailed description thereof will hereinafter be omitted or simplified in order to avoid complication.

User A controls a mobile device 20, such as a smartphone. Using device 20, user A checks-in into a bar by sending location information to a POS system 40, which includes a central processing unit (CPU) in communication with a memory and a display. The check-in can be wirelessly performed via direct communication with POS system 40 or via GPS, cellular network, Wi-Fi network, or a social networking service. The check-in can be performed via a wired technology as well. Upon successful check-in, mobile device 20 appears as physically present in the bar on the POS system 40.

Next, user A directly sends payment account data, as security, from mobile device 20 to POS system 40. The payment account data can be stored before user A checked-in, such as where user has a preexisting account in POS system 40, or the payment account data can be stored after the check-in. The payment account data is as described above. The transmission of the payment account is performed as described above.

Next, waiter W takes an order from user A. Waiter W can take the order after the received payment account data has been verified for authenticity and capability to provide payment. Waiter W can also take the order without verifying the authenticity and capability of providing payment. This can be done, for example, if another service, such as the financial institution, is used to perform such task or if the POS system 40 is programmed to forego such payment verification.

Upon taking of the order, user A identifies him/herself as A and waiter W subsequently inputs the order into POS system 40, which stores the order on users A account as created or enabled via the check-in or the storage or verification of the payment account data information. As waiter W inputs the order, POS system 40, either in real-time or via a pre-programmed delay, directly or indirectly, sends, as described above, the order data to the application on mobile device 20. As a result, user A can view his/her individual bill, either in real-time or via a pre-programmed delay. The order data may include an itemized price list of the order, as described above, and a total amount due of the order, as described above. If user A subsequently modifies his/her order, then updated order data is sent to mobile device 20. The modification process and updated order data can be repeated multiple times and the bill is updated during or after each modification.

At any point, user A can pay his/her entire bill or a portion of his/her bill by wirelessly sending a pay bill request from mobile device 20 to POS system 40, which upon receipt of the pay bill request, charges an account associated with the payment account data. The pay bill request includes data corresponding to a specific amount the user desires to charge to the account. The payment account data can be verified after the receipt of the pay bill request. A bill pay confirmation request can be sent to mobile device 20 after the account associated with user A payment account data has been charged. User A can also add a tip to the pay bill request so the payment would cover the bill and a tip to waiter W.

After user A paid his/her bill, in order to prevent unauthorized charges, user A can wirelessly send a request to either halt access to his/her account stored in the POS system 40 or have his/her account deleted from the POS system 40. A confirmation of halting access or account deletion can be sent to mobile device 20.

User B controls mobile device 30 and, similarly to user A, performs the check-in and the submission of the payment account data. If users A and B jointly place one order and waiter W enters that order as such, then users A and B each can pay a specified portion of the bill by wirelessly sending multiple pay bill requests from mobile devices 20 and 30 to POS system 40. Upon receipt of the pay bill requests, POS system 40 charges multiple accounts associated with the payment account data submitted from mobile devices 20 and 30. The payment account data submitted via mobile devices 20 and 30 can be associated with one account. User A can pay his/her share of the bill by wirelessly sending a pay bill request associated the payment account data submitted from mobile device 20 and have user B pay his/her share of the bill by wirelessly sending a pay bill request associated the payment account data submitted from mobile device 30 at different times. If user B checks-in, but cannot submit payment account data or the submitted payment account data is invalid, then user A can pay B's portion of the bill by wirelessly sending a pay bill request associated the payment account data submitted from mobile device 20 and POS system 40 crediting user A as paying B's portion of the bill. However, if desired, user B can manually pay the remaining portion of the bill.

Figure 3:
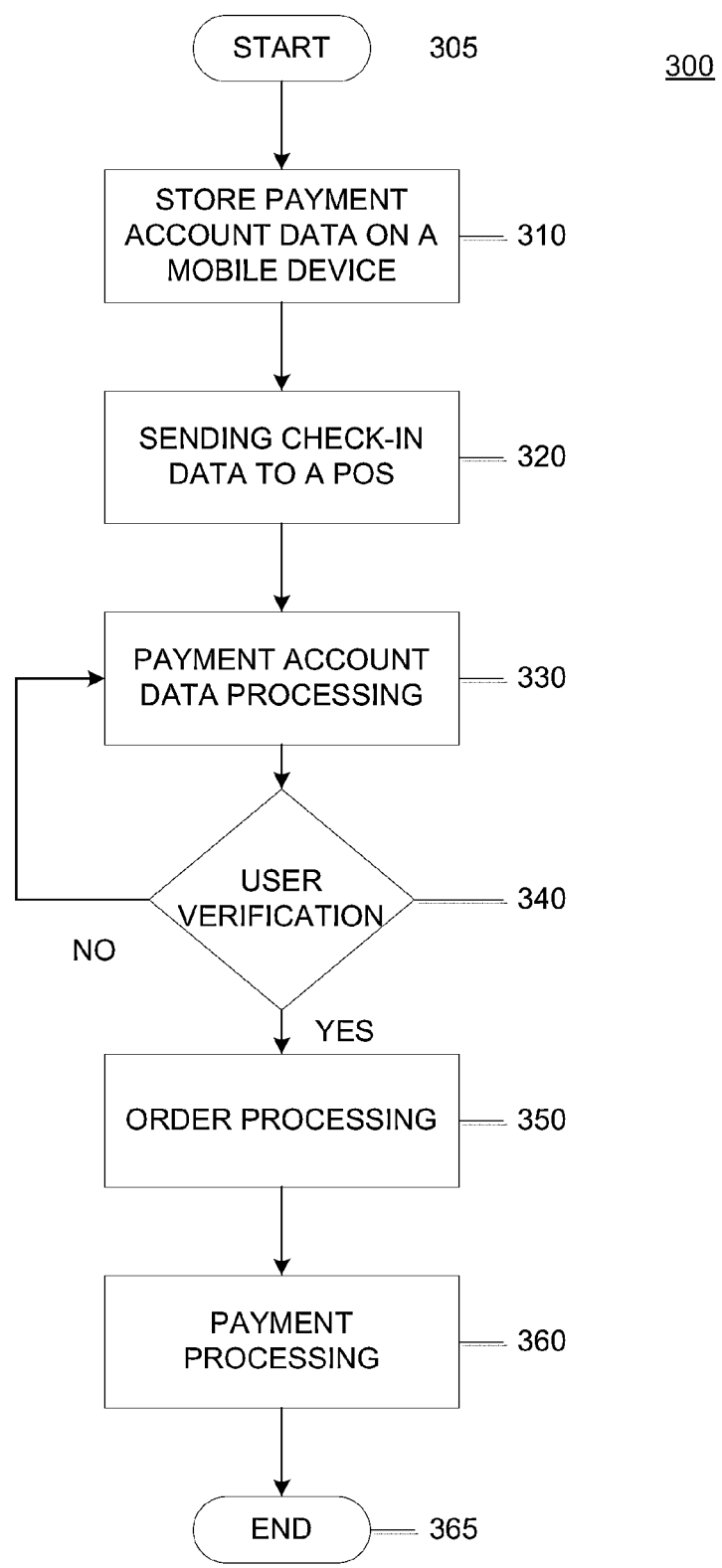
FIG. 3 is a flowchart of an example embodiment of a process for viewing, sharing and paying a bill in a restaurant via a mobile device according to the present disclosure.

FIG. 3 is a flowchart of an example embodiment of a process for viewing, sharing and paying a bill in a restaurant via a mobile device according to the present disclosure. Some elements of this figure are described above. Thus, same reference characters identify same or like components described above and any repetitive detailed description thereof will hereinafter be omitted or simplified in order to avoid complication. Process 300 includes blocks 305-365. Process 300 starts in block 305.

Block 310 is storing the payment account data on the mobile device. The user of the mobile device stores the payment account data prior to entering the restaurant or the bar. Alternatively, the user stores the payment account data after to entering a restaurant or a bar.

The payment account data can be manually input by the user into the software application running on the mobile device. The software application stores the input data in the memory of the mobile device or wirelessly transmits the input data to a website/server for storage. However, the software application can automatically retrieve/import the payment account data from another software application or from an online payment account data aggregator.

Block 320 is sending check-in data to the POS system. The user can check-in into the restaurant or the bar by sending location information to the POS system. The check-in can be performed via the NFC chip coupled to the mobile device communicating with the NFC chip reader coupled to the POS system. The check-in can be automatically or manually wirelessly performed via a GPS protocol or a social networking service. The POS system can function as a network gateway/router by creating a WPAN or a WLAN and the mobile device automatically detects the presence of such network and thereby checks-in into the POS system. Regardless of the method, upon successful check-in, the mobile device appears to the POS system as physically present in the restaurant or the bar. For example, when the user walks into the bar, the software application, running either in the background or the foreground of the mobile device, automatically detects the presence of the WPAN and checks-in the user into the POS system.

Block 330 is payment account data processing. Payment account processing involves transmitting the payment account data from the mobile device to the POS system and creating a new user account associated with the transmitted payment account data and ensuring validation and verification of the provided payment account data. Payment account data processing is further explained in reference to FIG. 4. Alternative to creating the new user account, a preexisting account can be associated with the transmitted payment account data.

Block 340 is user verification. The user verification involves determining whether the user of the mobile device is identical to the user authorized to incur the charge to the payment account associated with the payment account data. If the user verification is successful, then process 300 continues on to block 350. If the user verification is not successful, then process 300 continues on to step 330.

Block 350 is order processing. The order processing involves taking the order from the user, associating the order with the already validated and verified payment account data and allowing the user to view the bill associated with the order. Also, the order processing may involve modifying the order if the user desires to modify the order. Order processing is further described in reference to FIG. 5.

Block 360 is payment processing. The payment processing involves allowing the user to pay at least a portion of the bill, process the payment of the bill and halt access to the stored payment account data. The payment processing is further described in reference to FIG. 6.

Figure 4:
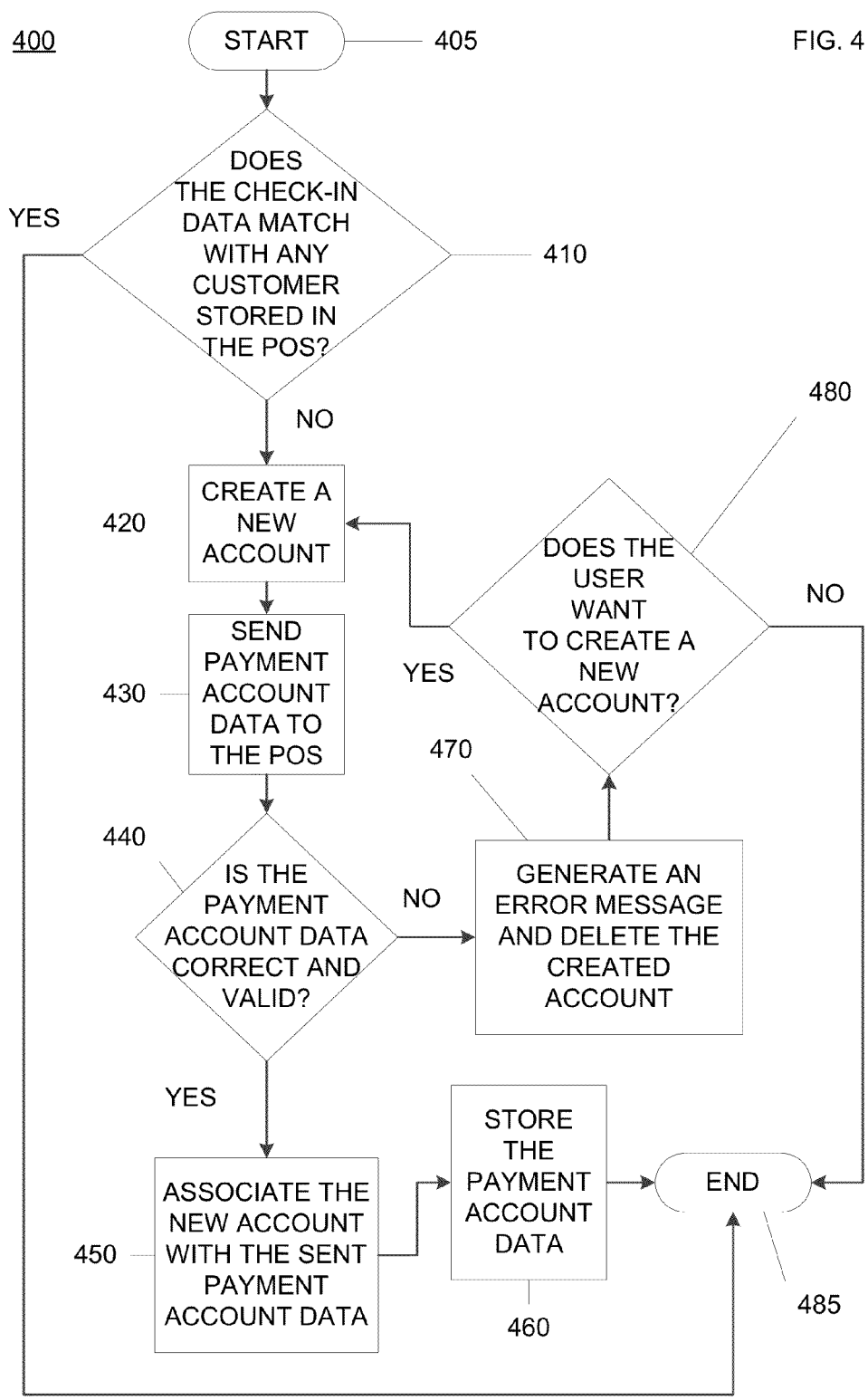
FIG. 4 is a flowchart of an example embodiment of a process for payment account data processing according to the present disclosure.

FIG. 4 is a flowchart of an example embodiment of a process for payment account data processing according to the present disclosure. Some elements of this figure are described above. Thus, same reference characters identify same or like components described above and any repetitive detailed description thereof will hereinafter be omitted or simplified in order to avoid complication. Process 400 includes blocks 405-485.

Block 410 is determining whether the stored check-in data matches with any customer account already stored in the POS system. Determining may be done manually or automatically. If a match is found, then process 400 continues on to block 420. Otherwise, process 410 ends at block 485.

Block 420 is creating a new account. Creating the new account may be done manually or automatically. The creation of the new account can include inputting into the POS system a first name or a last name of the user. Alternatively, other information, such as a date of birth or a password, can be input as well.

Block 430 is sending the stored/accessible payment account data to the POS system. The store/accessible payment account data may be sent to the POS system via a wired or a wireless means. The wired means can be a dock compatible with the mobile device where upon coupling the mobile device to the dock, the POS system automatically or manually retrieves/imports the payment account data from the mobile device. The wireless means can be a direct connection via WPAN/WLAN to the POS system where upon a certain user action, such as clicking a graphical user interface (GUI) element, the payment account data is directly wirelessly transmitted to the POS system. The payment account data can be sent to the POS system via a website coupled or linked to the POS system, where the website can be accessible via the mobile device. For example, the user wirelessly logs on to the website from the table where the user sits and directs the website to promptly send the payment account data to the POS system located at the restaurant or the bar.

Block 440 is a determination is made as to whether the sent payment account data is correct and valid. The payment account data is checked for proper data format, identification, sufficient funding and ability for conducting an actual payment transaction. If yes, then process 400 continues to block 450. If not, then process 400 continues to block 470.

Block 450 is associating the new account with the correct and validated payment account data.

Block 460 is storing the payment account data in the POS system. The payment account data can be stored in the memory in communication with or coupled to the POS system. The payment account data can be stored on a server in communication with the POS system. The payment account data can be stored on a server offsite.

Block 470 is a generation of an error message and a deletion of the created account. If the payment account data is incorrect or invalid, then an error message is generated by the POS system and the created account is deleted from the POS system.

Block 480 is a determination whether the user desires to create a new account with a correct and valid payment account data. If so, then process 400 continues to step 420. Otherwise, process 400 ends at block 485.

Figure 5:
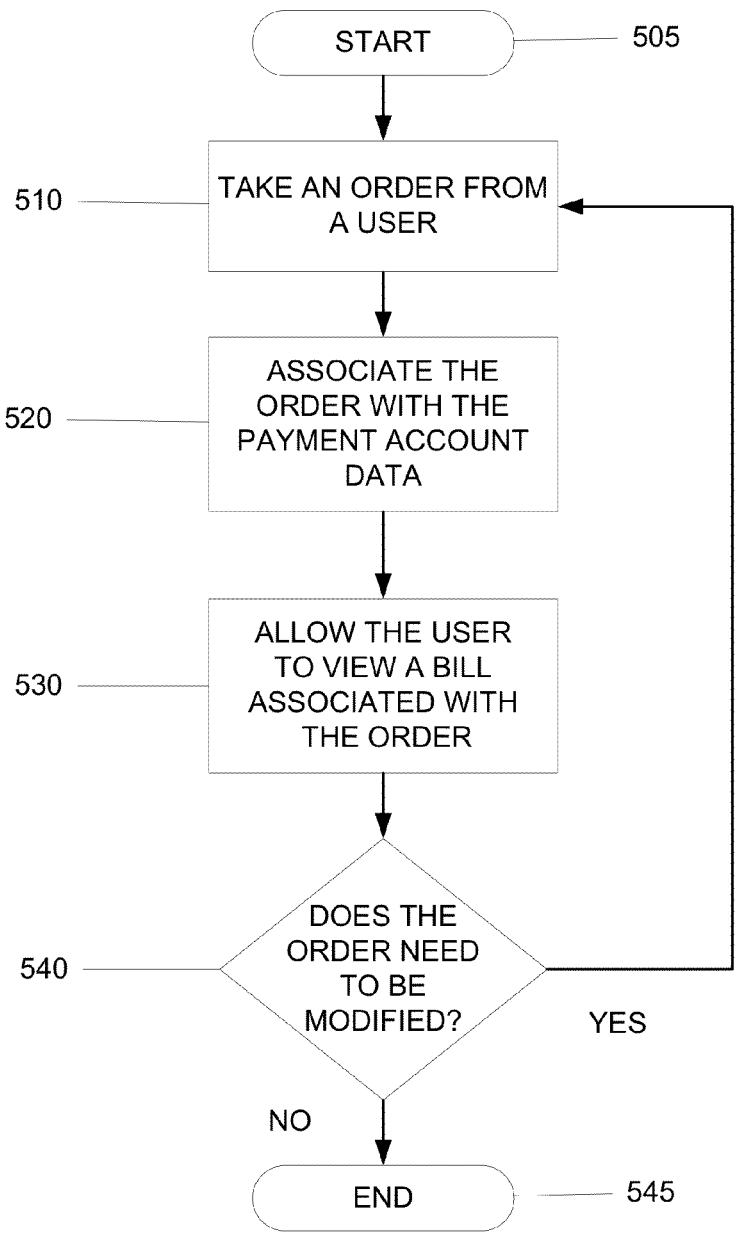
FIG. 5 is a flowchart of an example embodiment of a process for order processing according to the present disclosure.

FIG. 5 is a flowchart of an example embodiment of a process for order processing according to the present disclosure. Some elements of this figure are described above. Thus, same reference characters identify same or like components described above and any repetitive detailed description thereof will hereinafter be omitted or simplified in order to avoid complication. Process 500 includes blocks 505-545.

Block 510 is taking an order from the user. An order includes an ordered food item, such as bread, steak or chips, or a liquid item, such as a bottle of water, juice, spirits or beer. An order is placed by the user of the mobile device or a party, such as a friend or a child or a spouse, associated with the user of the device. For example, if a parent and a child visit a restaurant and the parent controls a mobile device, then either the parent or the child can place the order on behalf of the child and the parent. The order can be placed via orally communication with a waiter, who subsequently enters the order into the POS system. The order can be placed by orally speaking into a microphone, such as at a drive-in at a restaurant, and the waiter entering the order into the POS system. The order can be placed into a voice recognition system where the order is automatically entered into the POS system.

Block 520 is associating the order with the stored payment account data. The association is performed by matching the taken order with the payment account data in order that payment for the order is ensured even if the user walks out prior to the delivery of the ordered items. The association can be manually or automatically performed via the POS system.

Block 530 is allowing the user to view a bill associated with the order. The bill includes order data, such as an itemized price list of the order and a total amount due of the order. The order data is data, which includes an itemized price list of the order, such as a listing of an ordered item and its price, and a total amount due of the order, such as a sum of all prices of all ordered items. The allowing can be performed via the infrastructure as described above. For example, the allowing can be performed by the POS system where the POS sends a message to the user, which includes the order data. As or after the waiter enters the order into the POS system, the POS system stores the order and then wirelessly sends a message, which includes the order data, to the mobile device for display on the mobile device. The sending of the message allows real-time display of the stored order on the mobile device. Alternatively, the message can be sent via a predetermined time delay or upon a request to the mobile device.

Block 540 is a determination whether the order needs to be modified. If no, then process 500 ends at block 545. If yes, then process 500 continues to step 510. For example, when the user places an order and then decides to modify the order, then the order, such as a bar tab, is updated and then a new message, which includes the updated order data, is sent to the mobile device for display on the mobile device. The determination can be made by the user or the waiter or the POS system.

Figure 6:
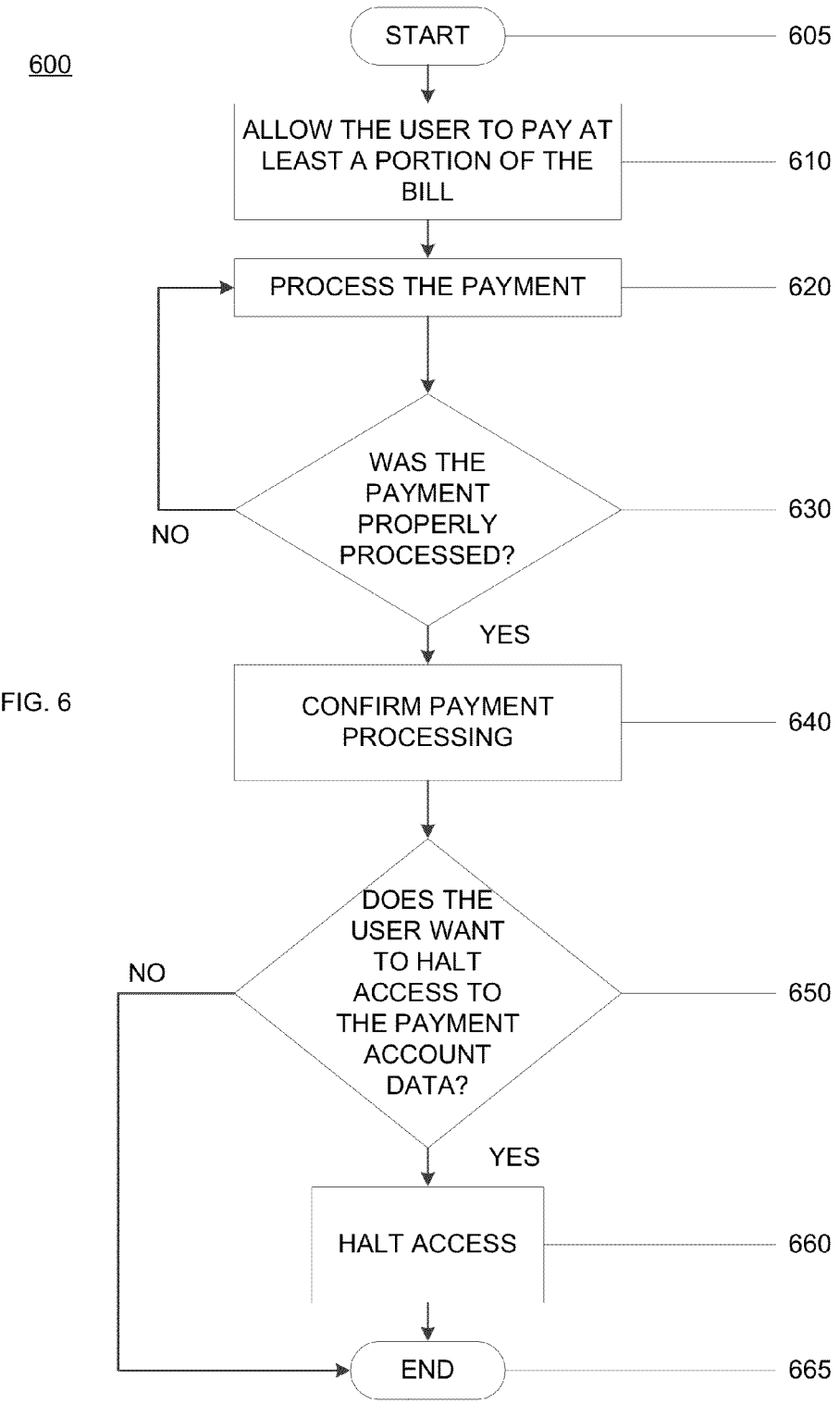
FIG. 6 is a flowchart of an example embodiment of a process for payment processing according to the present disclosure.

FIG. 6 is a flowchart of an example embodiment of a process for payment processing according to the present disclosure. Some elements of this figure are described above. Thus, same reference characters identify same or like components described above and any repetitive detailed description thereof will hereinafter be omitted or simplified in order to avoid complication. Process 600 includes blocks 605-665. Process 600 starts in block 605.

Block 610 is allowing the user to pay at least a portion of the bill. Such allowance is performed in the POS by designating the bill as payable/due and displaying a corresponding message on the screen of the POS. Multiple users can split the bill.

Block 620 is processing the payment. At any point, the user can pay his/her entire bill or a portion of his/her bill by wirelessly sending a pay bill request from the mobile device to the POS. Upon receipt of the pay bill request, the POS charges an account associated with the payment account data. The pay bill request includes data corresponding to a specific amount the user desires to charge to the account. The payment account data is verified after the receipt of the pay bill request.

Block 630 is a determination whether the payment was properly processed. If not, then process 600 continues to block 620. If yes, then process 400 continues to block 640.

Block 640 is a confirmation of the payment processing. A bill pay confirmation request can be sent to the mobile device after the account associated with the user's payment account data has been charged. The user can also add a tip to the pay bill request so the payment would cover the bill and the tip to the waiter. The confirmation is a text message, an instant message, a notification, a popup screen or an email sent to the account associated with the payment account data. The confirmation is sent to the software application, which checks-in the user or sends the payment account data to the POS.

Block 650 is a determination whether the user desires to halt access to the stored payment account data. If not, then process 600 ends at block 665. If yes, then process 600 continues to block 660. The halting of the access can be desired in order to prevent future unauthorized charges. The user manually or automatically via the software application, which checks-in the user or sends the payment account data, can send a request to the POS or the website associated with the POS to either halt access to the payment account data stored in/linked via the POS or have his/her account deleted from the POS/the website coupled to the POS.

In block 660, access to the payment account data is halted. At least one of the software application, the website coupled to the POS and the POS halt access to the payment account data. After halting of the access, the payment account data can be deleted from the system on which the payment account data is stored. A confirmation of halting access or account deletion can be sent to mobile device 20.

Multiple users can check-in and submit multiple instances of payment account data, wherein each instance is associated with a different user. If multiple users jointly place one order and the waiter enters the order as such, then each of the multiple users can pay a specified portion of the bill by wirelessly sending multiple pay bill requests from their respective mobile devices. Upon receipt of the multiple unique pay bill requests, the multiple accounts associated with the payment account data submitted by the multiple users are charged.

The payment account data submitted via multiple mobile devices can be associated with one account. One user can pay his/her share of the bill by sending a pay bill request associated the payment account data submitted from one mobile device and have another user pay his/her share of the bill by sending another pay bill request associated the payment account data submitted from another mobile device at different times. If one user checks-in, but cannot submit payment account data or the submitted payment account data is invalid, then the other user can make up for lack of payment of the one user and pay the one user's portion or any other portion of the bill by sending a pay bill request associated the payment account data submitted from his/her mobile device and the POS would credit the original user as paying his/her portion or any other portion of the bill. However, if any amount remains on the bill, then the remaining portion of the bill can be manually paid by the one user.

Figure 7:
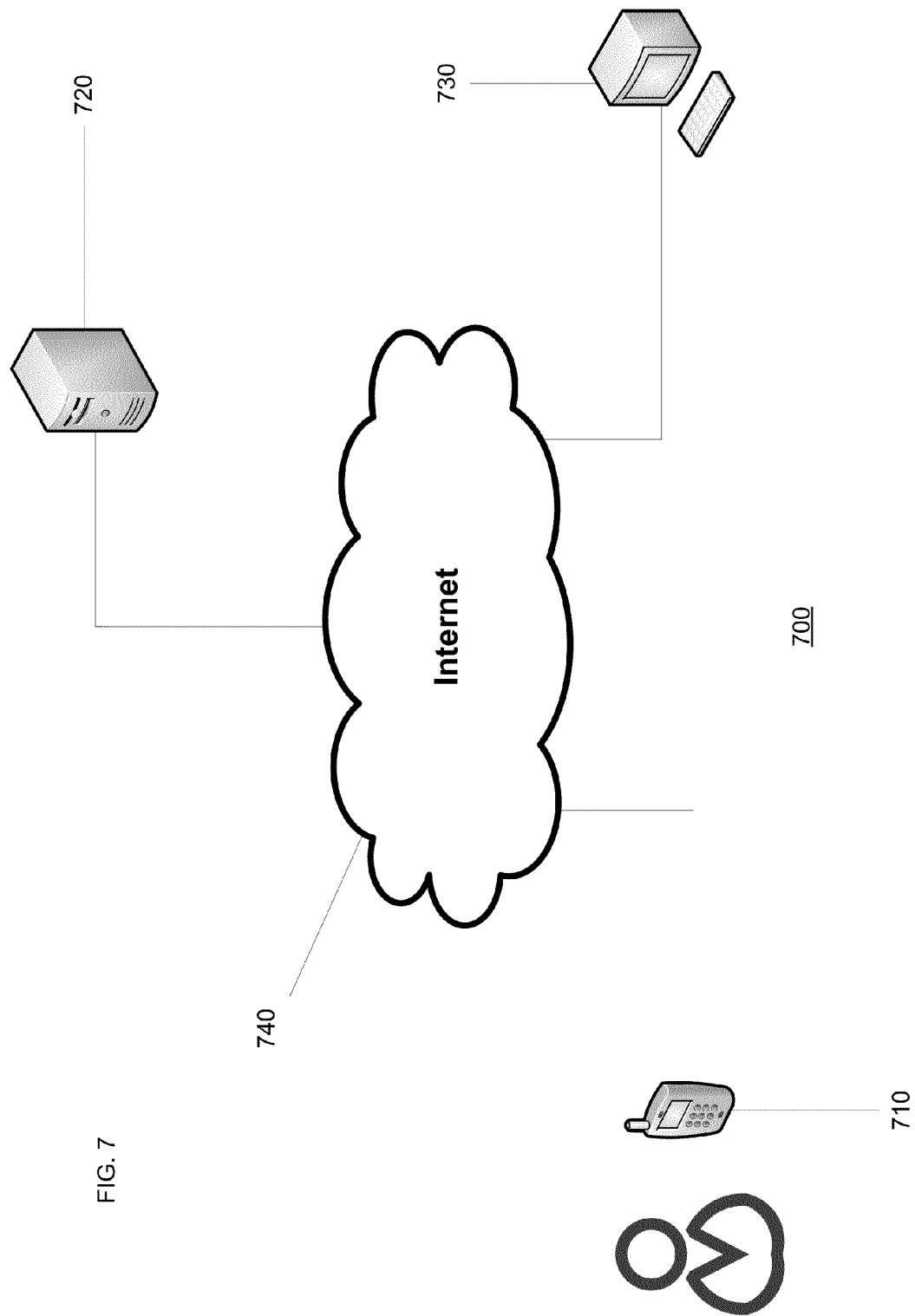
FIG. 7 is a diagram of an example embodiment of a network environment for allowing a user of a mobile device to view, share and pay a bill in a restaurant or a bar in real-time via the mobile device according to the present disclosure.

FIG. 7 is a diagram of an example embodiment of a network environment for allowing a user of a mobile device to view, share and pay a bill in a restaurant or a bar in real-time via the mobile device according to the present disclosure. Some elements of this figure are described above. Thus, same reference characters identify same or like components described above and any repetitive detailed description thereof will hereinafter be omitted or simplified in order to avoid complication. Network environment 700 includes a mobile device 710, a server 720 and a POS system 730 and Internet 740.

Mobile device 710 includes a CPU, memory, a communication means and an operating system configured to run a software application capable of at least one of checking-in, storing and sending payment account data, placing an order, viewing and paying at least a portion of the bill. Mobile device 710 is capable of directly or indirectly connecting to Internet 740 and directly or indirectly communicating with server 720 and POS system 730.

Server 720 includes a CPU, memory, a communication means and an operating system configured to run a software application capable of at least one of receiving and storing payment account data from mobile device 710 and transmitting the payment account data to POS system 730. Server 720 is capable of directly or indirectly connecting to Internet 740 and directly or indirectly communicating with mobile device 710 and POS system 730. Server 720 can host a website coupled to POS system 730.

POS system 730 includes a CPU, memory, a communications means and an operating system configured to run a software application capable of at least one of processing check-ins, receiving and storing payment account data, user verification, sending a message which includes a detailed bill and payment processing. POS system 730 is capable of directly or indirectly connecting to Internet 740 and directly or indirectly communicating with mobile device 710 and server 720. POS system 730 can be located within a bar, a restaurant or another establishment having a restaurant or a bar, such as a hotel, an airport or a sports arena, regardless of whether serving the food or the drink is the primary function of the establishment. Any of the embodiments or features of the embodiments disclosed herein can be combined in any way according to the principles of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method for allowing a customer to view and at least partially pay a bill incurred in a bar or a restaurant, the method comprising:
    operating a POS system at the bar or the restaurant for tracking the bill and the bar or the restaurant having staff, wherein the POS system communicating with a customer mobile computing device;

receiving, via the POS system, customer check-in data at the restaurant or the bar in response to checking-in via the mobile computing device and customer payment account data as a payment security in response to authorizing access to the payment account data via the mobile computing device;

validating, via the POS system, the received payment account data for payment capability;

receiving, via the staff, an order from the customer using the POS system and associating, via the staff, the order with the validated payment account data in the POS system through utilizing the check-in data, wherein the check-in data indicating the customer as being physically present in proximity to the POS system;

displaying the bill in real-time via the mobile computing device upon the associating, the bill including the order;

receiving at least partial payment according to the validated payment account data in response to authorizing the at least partial payment via the mobile computing device;

tagging other visitors by the mobile computing device, tagging indicative of presence of the other visitors in the bar or the restaurant, the customer and the other visitors splitting the bill via the other visitors submitting the other visitors payment information only, the other visitors operating personal mobile devices; and tagging the other visitors by the mobile computing device when the other visitors also check-in via the personal mobile devices.

2. The method of claim 1, further comprising:
modifying, via the staff, the order in the POS system; and
updating the bill via the POS system, the updating corresponding to the modifying, wherein the displaying and the receiving reflecting the updating.

3. The method of claim 2, further comprising:
splitting the bill between the customer and another customer in response to bill split authorization via the mobile computing device, the another customer operating another mobile computing device in communication with the POS system, the split reflecting in the another mobile computing device.

4. The method of claim 3, further comprising at least one of:
halting access to the payment account data in the POS system after the receiving in response to authorizing the halting via the mobile computing device; and
deleting the payment account data in the POS system after the receiving in response to authorizing the deleting via the mobile computing device.

5. The method of claim 2, further comprising:
displaying, via the POS, the customer as being physically present in proximity of the POS system in response to the checking-in,
wherein the authorizing the at least partial payment via the mobile computing device including authorizing charging the security.

6. A method for allowing a customer to view and at least partially pay a bill incurred in a bar or a restaurant, the method comprising:
operating a POS system at the bar or the restaurant for tracking the bill and the bar or the restaurant having staff, wherein the POS system communicating with a customer mobile computing device;

receiving, via the POS system, check-in data and payment account data submitted via the mobile computing device;

receiving an order from the customer taken by the staff, the check-in data indicating the customer as being physically present in proximity to the POS system, the payment account data serving as a payment security in response to authorizing access to the payment account data;

validating, via the POS system, the received payment account data for payment capability;

associating, in the POS system, by the staff, the order with the validated payment account data through utilizing the check-in data;

sending, from the POS system, display data to the mobile computing device to display the bill via the mobile computing device in real-time upon the associating, the bill including the order;

at least partially receiving, via the POS system, the validated payment account data for the bill in response to at least partial payment authorization via the mobile computing device;

tagging other visitors by the mobile computing device, tagging indicative of presence of the other visitors in the bar or the restaurant, the customer and the other visitors splitting the bill via the other visitors submitting the other visitors payment information only, the other visitors operating personal mobile computing devices; and tagging the other visitors by the mobile computing device when the other visitors also check-in via the personal mobile computing devices.

7. The method of claim 6, further comprising:
modifying, via the staff, the order in the POS system; and
updating the bill via the POS system, the updating corresponding to the modifying, wherein the sending and the charging reflecting the updating.

8. The method of claim 7, further comprising:
splitting the bill between the customer and another customer in response to bill split authorization via the mobile computing device, the another customer operating another mobile computing device in communication with the POS system, the split reflecting in the another mobile computing device.

9. The method of claim 7, further comprising at least one of:
halting access to the payment account data in the POS system after the charging in response to authorizing the halting via the mobile computing device; and
deleting the payment account data in the POS system after the charging in response to authorizing the deleting via the mobile computing device.

10. A system comprising:
a personal mobile phone operated by a bar or a restaurant visitor;
a point-of-sale (POS) system operative to communicate with the personal mobile phone, the POS system stationed within a bar or a restaurant having staff, the POS system configured to:
receive check-in information and payment information via the personal mobile phone;
display the visitor as physically present upon receiving the check-in information;
facilitate validation of the received payment information for payment capability;

associate the validated payment information with an order taken from the visitor by the staff in response to the staff operating the POS system and utilizing the check-in information;

receive at least partial payment for the bill according to the validated payment information in response to the personal mobile phone authorizing the at least partial payment;

the personal mobile phone configured to:

display a bill for the order in real-time upon the associating, the bill including the order;

tag other visitors, tagging indicative of presence of the other visitors in the bar or the restaurant;

split the bill among the visitor and the other visitors via the other visitors submitting the other visitors payment information only, the other visitors having personal mobile computing devices; and tag the other visitors when the other visitors also check-in via the personal mobile computing devices.

11. The system of claim 10, wherein the staff modify the order in the POS system such that the bill is updated in the POS system according to the modification, the personal mobile phone displaying the updated bill in real-time.

12. The system of claim 10, wherein the personal mobile phone operative to facilitate splitting of the bill between the visitor and another visitor operating another personal mobile phone in communication with the POS system, the splitting reflecting in another personal mobile phone, the visitor and the another visitor associated with the order.

13. The system of claim 10, wherein the POS system is operative to halt access to the validated payment information in response to authorizing the halting via the personal mobile phone, the POS system operative to delete the validated payment information in response to authorizing the deleting via the personal mobile phone.

14. The system of claim 10, wherein the personal mobile phone includes a touchscreen displaying a check-in icon, the POS system receiving the check-in information in response to the visitor selecting the check-in icon on the touchscreen.

* * * * *